US010285053B2

(12) United States Patent
Ahmed et al.

(10) Patent No.: US 10,285,053 B2
(45) Date of Patent: May 7, 2019

(54) SYSTEM AND METHOD FOR REDUCING AUTHENTICATION SIGNALING IN A WIRELESS NETWORK

(71) Applicant: Futurewei Technologies Inc., Plano, TX (US)

(72) Inventors: Hanan J. Ahmed, Belleville, MI (US); George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 57 days.

(21) Appl. No.: 14/684,211

(22) Filed: Apr. 10, 2015

(65) Prior Publication Data

US 2016/0302063 A1    Oct. 13, 2016

(51) Int. Cl.
| | | |
|---|---|---|
| *H04M 1/66* | (2006.01) | |
| *H04M 1/68* | (2006.01) | |
| *H04M 3/16* | (2006.01) | |
| *H04W 12/06* | (2009.01) | |
| *H04L 29/06* | (2006.01) | |
| *H04W 88/08* | (2009.01) | |

(52) U.S. Cl.
CPC ......... *H04W 12/06* (2013.01); *H04L 63/0884* (2013.01); *H04W 88/08* (2013.01)

(58) Field of Classification Search
CPC ..... H04L 69/08; H04L 69/24; H04L 63/0853; H04L 67/104; H04W 28/065; H04W 84/12

USPC ......... 455/436, 411, 465, 433; 370/19, 230, 370/355, 337, 503, 465, 474, 328, 331; 709/228, 206
See application file for complete search history.

(56) References Cited

U.S. PATENT DOCUMENTS

| | | | | |
|---|---|---|---|---|
| 8,582,430 B2* | 11/2013 | Ketchum | .......... | H04L 25/03343 370/230 |
| 2003/0172136 A1* | 9/2003 | Katagawa | ............... | G06F 9/547 709/220 |
| 2005/0135291 A1* | 6/2005 | Ketchum | ................ | H04L 29/06 370/319 |
| 2005/0273607 A1* | 12/2005 | Yamana | .................. | G06F 21/31 713/168 |
| 2006/0291455 A1* | 12/2006 | Katz | ....................... | H04L 29/06 370/355 |

(Continued)

FOREIGN PATENT DOCUMENTS

| | | |
|---|---|---|
| CN | 102026196 A | 4/2011 |
| WO | 2010127697 A1 | 11/2010 |

(Continued)

*Primary Examiner* — Joseph Arevalo
(74) *Attorney, Agent, or Firm* — Slater Matsil, LLP (57) ABSTRACT

A method for reducing authentication signaling in a wireless network includes identifying a plurality of access points in a network belonging to a group. An access request message is received from a first access point associated with a device being in range of the first access point. A determination is made whether the device has been authenticated within the group. A proxy accept message is sent to the to the first access point in response to the device being authenticated with the group without communicating with an authentication server for authentication of the device. A master access point may be used in performing the reduction of authentication signaling in the wireless network.

11 Claims, 7 Drawing Sheets

(56) References Cited

U.S. PATENT DOCUMENTS

| | | | | |
|---|---|---|---|---|
| 2007/0232307 | A1* | 10/2007 | Ibrahim | H04W 36/30 455/436 |
| 2008/0095118 | A1* | 4/2008 | Cakulev | H04L 63/0892 370/331 |
| 2009/0191847 | A1* | 7/2009 | Na | H04L 9/321 455/411 |
| 2009/0193253 | A1* | 7/2009 | Falk | H04L 63/065 713/171 |
| 2011/0202988 | A1* | 8/2011 | Otranen | H04L 9/3213 726/8 |
| 2012/0106735 | A1* | 5/2012 | Fukuda | H04L 9/083 380/255 |
| 2012/0294231 | A1* | 11/2012 | Finlow-Bates | H04W 48/14 370/328 |
| 2013/0238715 | A1* | 9/2013 | Sanyal | H01L 51/00 709/206 |
| 2014/0047514 | A1 | 2/2014 | Olshansky et al. | |
| 2014/0100961 | A1* | 4/2014 | Lee | G06Q 30/0267 705/14.64 |
| 2014/0273958 | A1* | 9/2014 | Messana | H04L 63/0884 455/411 |
| 2014/0370854 | A1* | 12/2014 | Woodward | H04W 8/02 455/411 |

FOREIGN PATENT DOCUMENTS

| | | | | |
|---|---|---|---|---|
| WO | WO-2013119043 A1 * | 8/2013 | | H04W 12/06 |
| WO | 2014094214 A1 | 6/2014 | | |

\* cited by examiner

FIG. 7A

SYSTEM AND METHOD FOR REDUCING AUTHENTICATION SIGNALING IN A WIRELESS NETWORK

TECHNICAL FIELD

The present disclosure relates in general to wireless telecommunications and more particularly to a system and method for reducing authentication signaling in a wireless network.

BACKGROUND

In a densely populated wireless network, such as a Wi-Fi local area network, there are many users attempting to access the network. In many instances, users are highly mobile and transitory and thus may not use the network for data traffic. However, these mobile users generate many authentication requests and at a high frequency rate. This authentication signaling creates a large overhead load on the network and may cause both backhaul congestion and heavy processing loads on the equipment. For those users just passing through and not running data traffic during the transition through the network, unnecessary authentication signaling is still performed over the air interface. The associations and disassociations occurring during authentication signaling flood the air interface with authentication requests and responses, which results in congestion toward an authentication server such as an authentication/authorization/accounting (AAA) server.

SUMMARY

From the foregoing, it may be appreciated by those skilled in the art that a need has arisen for reducing the amount of authentication signaling in a wireless network. In accordance with the present disclosure a system and method for reducing authentication signaling in a wireless network are provided that greatly reduces and substantially eliminates the problems associated with conventional authentication signaling techniques.

According to one embodiment, there is provided a method for reducing authentication signaling in a wireless network that comprises identifying a plurality of access points in a network belonging to a group. An access request message is received from a first access point associated with a device being in range of the first access point. A determination is made whether the device has been authenticated within the group. A proxy access accept message is sent to the first access point in response to the device being authenticated with the group without communicating with an authentication server for authentication of the device.

According to another embodiment, there is provided a system for reducing authentication signaling in a wireless network that includes a master access point associated with a group of access points. The master access point is operable to receive an access request message from a first access point in the group where the access request message is associated with a device in range of the first access point. The master access point is operable to determine whether the device is authenticated within the group. The master access point is further operable to send a proxy access accept message to the first access point in response to the device being authenticated within the group without communicating with an authentication server for authentication of the device.

According to still another embodiment, there is provided a non-transitory computer readable medium including code for reducing authentication signaling in a wireless network. The code when executed is operable to identify a plurality of access points in a network belonging to a group, receive an access request message from a first access point associated with a device being in range of the first access point, determine whether the device has been authenticated within the group, and send a proxy access accept message to the first access point in response to the device being authenticated with the group without communicating with an authentication server for authentication of the device.

The present disclosure describes many technical advantages over conventional authentication signaling techniques. For example, one technical advantage is to eliminate sending requests to the authentication server by identifying devices that have been authenticated within a group of access points when a device goes from one access point in the group to another access point in the group. Another technical advantage is to use a master access point to send proxy access accept messages to each access point belonging to a group when a device in the range of one of the access points in the group has been authenticated so that further authentication signaling is not needed when the device transitions from one access point to another access point in the group. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

FIGS. 1 through 7B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

Figure 1:
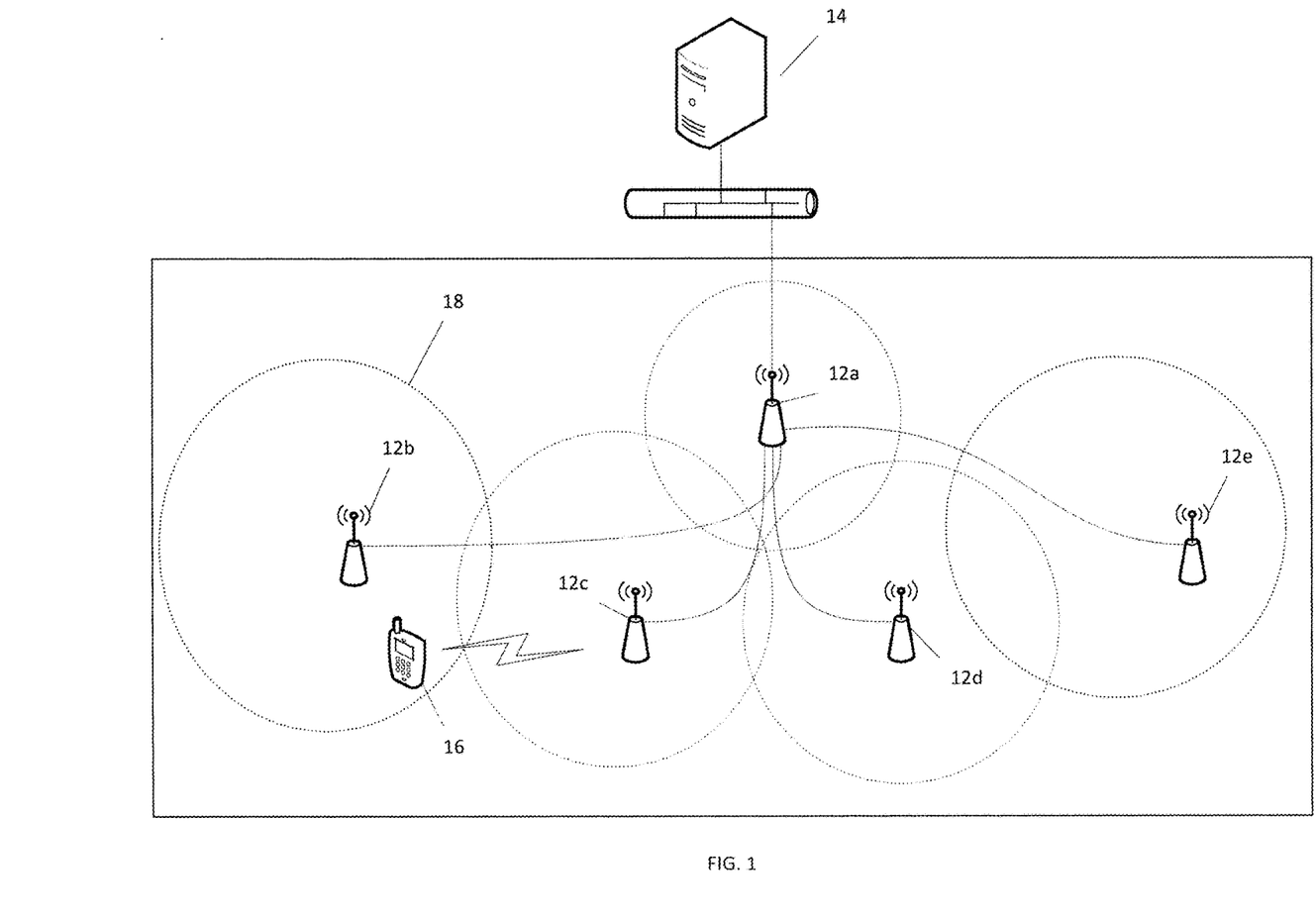
FIG. 1 illustrates an example wireless network.

FIG. 1 shows an example of a wireless network 10. Wireless network 10 includes a plurality of access points 12a-12e (or, collectively, access points 12) coupled to an authentication server 14 that provide communication capabilities for a device within range of wireless network 10, such as mobile device 16. An example of a server program that handles user requests for access to computer resources for an enterprise is an authentication/authorization/accounting (AAA) server. Each access point 12 has an area of coverage 18 in which operations take place. Wireless network 10 may be configured in a variety of ways. For example, access points 12 may communicate with authentication server 14 through a master access point 12a. Master access point 12a may have additional capabilities not found in the other access points 12. One or more of the other access points 12 may be a backup for master access point 12a in the event of its failure and may include the additional capabilities but are not active until a failure occurs in master access point 12a. As another example, each access point 12 may include the additional capabilities with the designation of master access point 12a being dynamically selected such that any access point may function as master access point 12a. In yet another example, there is no master access point 12a and each access point 12 is capable of communicating directly with authentication server 14 and with any other access point 12.

Figure 2:
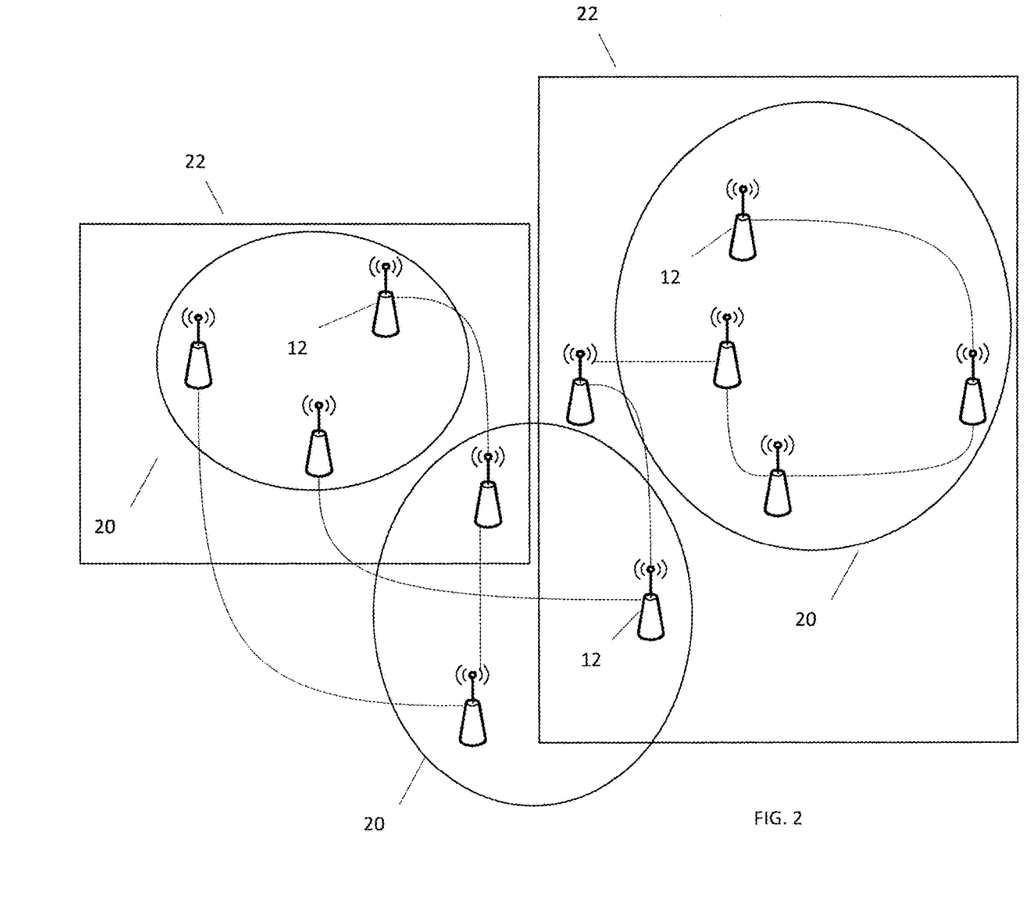
FIG. 2 illustrates an example grouping of access points in the wireless network.

FIG. 2 shows how grouping of access points 12 may be used to reduce unnecessary authentication signaling. A group 20 of access points 12 is established either through point to point communications between access points 12 or through a master access point 12a being designated for the group depending on the desired configuration of wireless network 10. Access points 12 in a particular group have a same group identifier indicating membership in the group. In addition to grouping, access points 12 may be placed into clusters 22. A cluster 22 may include one or more groups 20 and a group 20 may overlap into two or more separate clusters 22. One cluster 22 may overlap another cluster 22. Similarly, one group 20 may overlap another group 20. Access points 12 in a particular cluster 22 have a same cluster identifier indicating membership in that cluster. The end result is to create a virtual access point from the perspective of device 16 such that device 16 does not perceive any changes in transitioning from one access point 12 to another access point 12 within a group 20 or cluster 22. Different authentication techniques may be implemented in a cluster 22 as compared to a group 20. The membership of access points 12 in one or more groups 20 and clusters 22 may be dynamically changed as needed to adjust traffic patterns and alleviate congestion within a group or cluster and at the authentication server 14.

In one embodiment, a group 20 includes access points 12 and master access point 12a. After initial authentication upon entering group 20, when device 16 moves from one access point 12b to another access point 12c in group 20, there is no need for device 16 to be re-authenticated as long as device 16 remains in the virtual access point established by group 20. Master access point 12a acts as an authenticator and proxy authentication server. Master access point 12a keeps track of devices that have been initially authenticated within a particular group 20 and sends an individual proxy access accept message to access point 12c within group 20 upon receiving an access request message from access point 12c when device 16 has transitioned from access point 12b to access point 12c.

In a further embodiment, once device 16 has been initially authenticated within a group 20, master access point 12a broadcasts a proxy access accept message to all access points 12 in group 20. When device 16 transitions from access point 12b to access point 12c, access point 12c recognizes from the proxy access accept message that device 16 has been authenticated and does not send an access request message to master access point 12a or authentication server 14. Instead, access point 12c sends an update notification message to master access point 12a so that master access point 12a knows that device 16 is now associated with access point 12c. Access point 12c also sends an authorization response message to device 16. Access point 12c may be configured such that the broadcast proxy access accept message may be active for a limited amount of time. As long as device 16 requests authentication with access point 12c within the active time limit, access point 12c sends the update message to master access point 12a and the authorization response message to device 12. Outside of this active time limit, access point 12c sends an access request message to master access point 12a or authentication server 14 for processing.

In an alternative embodiment, there is no master access point 12a. All access points 12 in the group have similar functionality and communication capabilities with authentication server 14. Once device 16 is authenticated by a particular access point 12b, all other access points 12 in group 20 are notified of the virtual access point established by group 20 through access point 12b. When device 16 transitions to access point 12c, a new update notification is sent by access point 12c to the other access points of group 20.

To reduce the impact on the air interface as well as toward authentication server 14, all access points 12 of the virtual access point established through group 20 may broadcast in their beacon and probe response messages the group identifier for group 20. Once authenticated within group 20, device 16 receives the group identifier. As device 16 transitions from one access point to another within group 20, it receives the beacon and probe response messages and compares the group identifier from these messages to the authenticated group identifier. Upon detecting a match, device 16 does not transmit authentication requests. Device 16 only attempts authentication when the group identifier from the beacon and probe response messages is different from the group identifier of group 20 of which it is authenticated.

Two levels of authentication may be implemented in wireless system 10. A first authentication may be a group authentication that allows device 16 to send and receive management frames. A limited amount of data traffic may be allowed in group authentication that may be dependent on access point 12, device 16, and/or subscriber. A second authentication may be a single authentication when device 16 requests data access. When requesting data, device 16 may proceed through this single authentication despite having group authentication. The two-level authentication technique may be implemented in several ways. For example, group authentication is performed when a device 16 enters the group and no further authentication is performed while device 16 remains in the coverage areas 18 of the group unless device 16 requests data or only particular data. Single authentication is performed upon the data request. In another example, group authentication is performed for certain devices and subscribers while single authentication is required for other devices and subscribers. In this example, group authentication may be performed for known transitory devices through the group or first time devices entering the group while single authentication may be performed for devices entering through handover or known data traffic users in the group.

Figure 3:
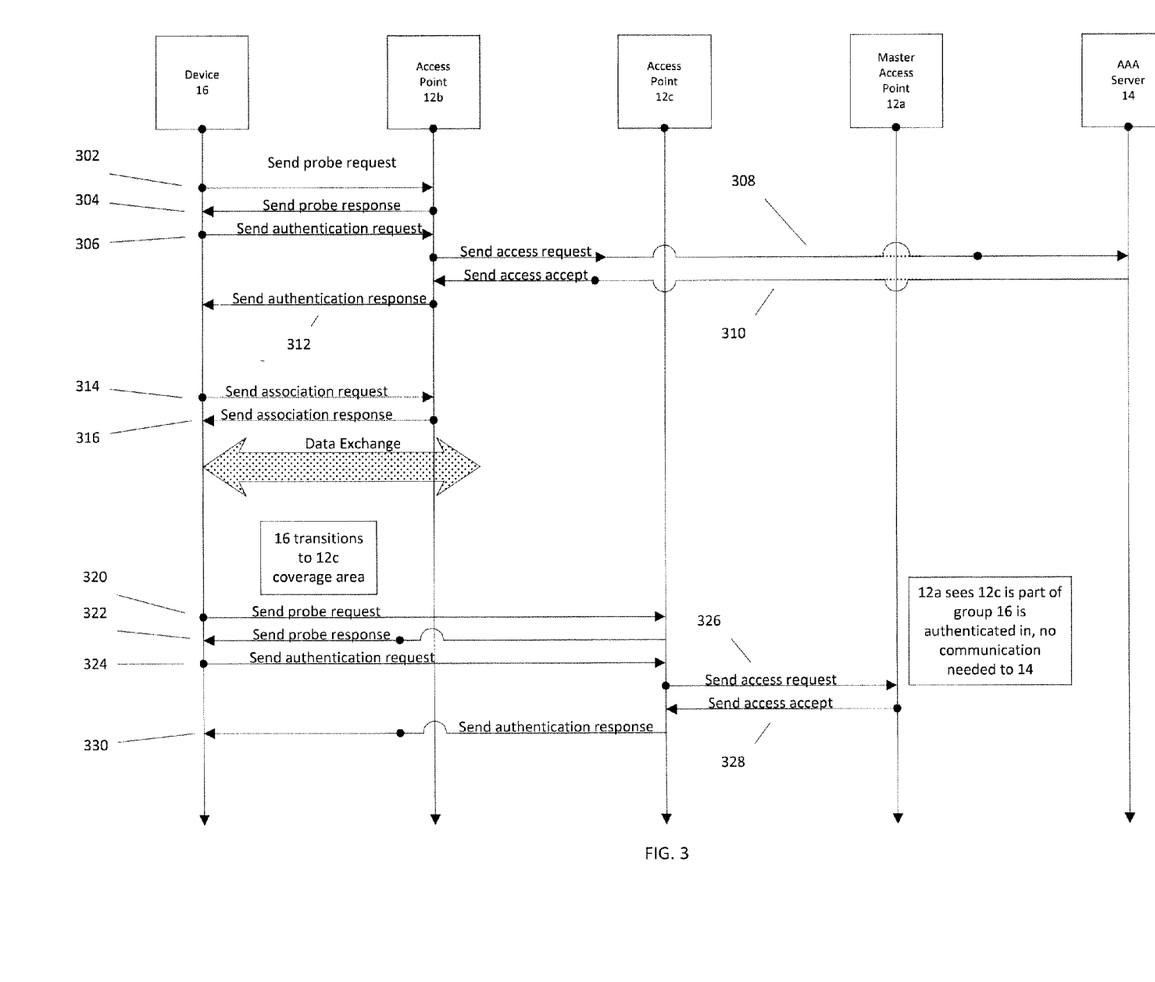
FIG. 3 illustrates a process for authenticating a device while it moves from one access point to the next access point of a group in the wireless network.

FIG. 3 shows an example process for reducing authentication signaling in a wireless network using a master access point, according to this disclosure. For ease of explanation, the process is described as being used with the components of wireless network 10 of FIG. 1. However, the process could be used by any suitable device and in any suitable system or network.

In operation, device 16 first enters wireless network 10 within a range of a first wireless access point 12*b*. Device 16 may send a probe request message 302 to determine an access point 12 with which to communicate. In this case, access point 12*b* sends a probe response message 304 detected by device 16. Device 16 sends an authentication request message 306 to access point 12*b*. An access request message 308 is sent to authentication server 14 either directly or through master access point 12*a* depending on the configuration of wireless network 10. Authentication server 14 returns an access accept message 310 (either directly or through master access point 12*a*) that is provided to access point 12*b*. The access accept message 310 indicates that device 16 has been authenticated in wireless network 10. Access point 12*b* sends an authentication response message 312 to device 16 informing device 16 that authentication has succeeded. If device 16 desires a data exchange through access point 12*b*, device 16 sends an association request message 314 to access point 12*b*. Access point 12*b* returns an association response message 316 to device 16 to allow device 16 to begin a data exchange. However, as device 16 is merely passing through the coverage area 18 of access point 12*b*, device 16 would not send an association request message 314 to access point 12*b* as device 16 does not desire a data exchange.

As device 16 leaves the range of access point 12*b* and enters a range of a second wireless access point 12*c*, the above operational process is normally repeated with access point 12*c*. Device 16 sends a probe request message 320 to access point 12*c* and access point 12*c* sends a probe response message 322 to device 16 with the appropriate information. Normally, authentication signaling for device 16 would occur at this point and access point 12*c* would communicate with authentication server 14 for authentication purposes. However, continuing authentication signaling handshaking leads to congestion over the air interface and at authentication server 14 when large numbers of devices are factored into the operation. To avoid this, access point 12*b* and access point 12*c* are placed into a group 20. Upon device 16 authentication at access point 12*b* and as device 16 moves into a range of access point 12*c*, device 16 sends an authentication request message 324 to access point 12*c*. Access point 12*c* sends an access request message 326 to master access point 12*a*. Master access point 12*a* determines that device 16 is already authenticated in group 20. Upon such determination, master access point 12*a* sends an access accept message 328 to access point 12*c* and an authentication response message 330 is then sent by access point 12*c* to device 16. With this determination, master access point 12*a* need not communicate with authentication server 14, thus reducing message congestion at authentication server 14.

Figure 4:
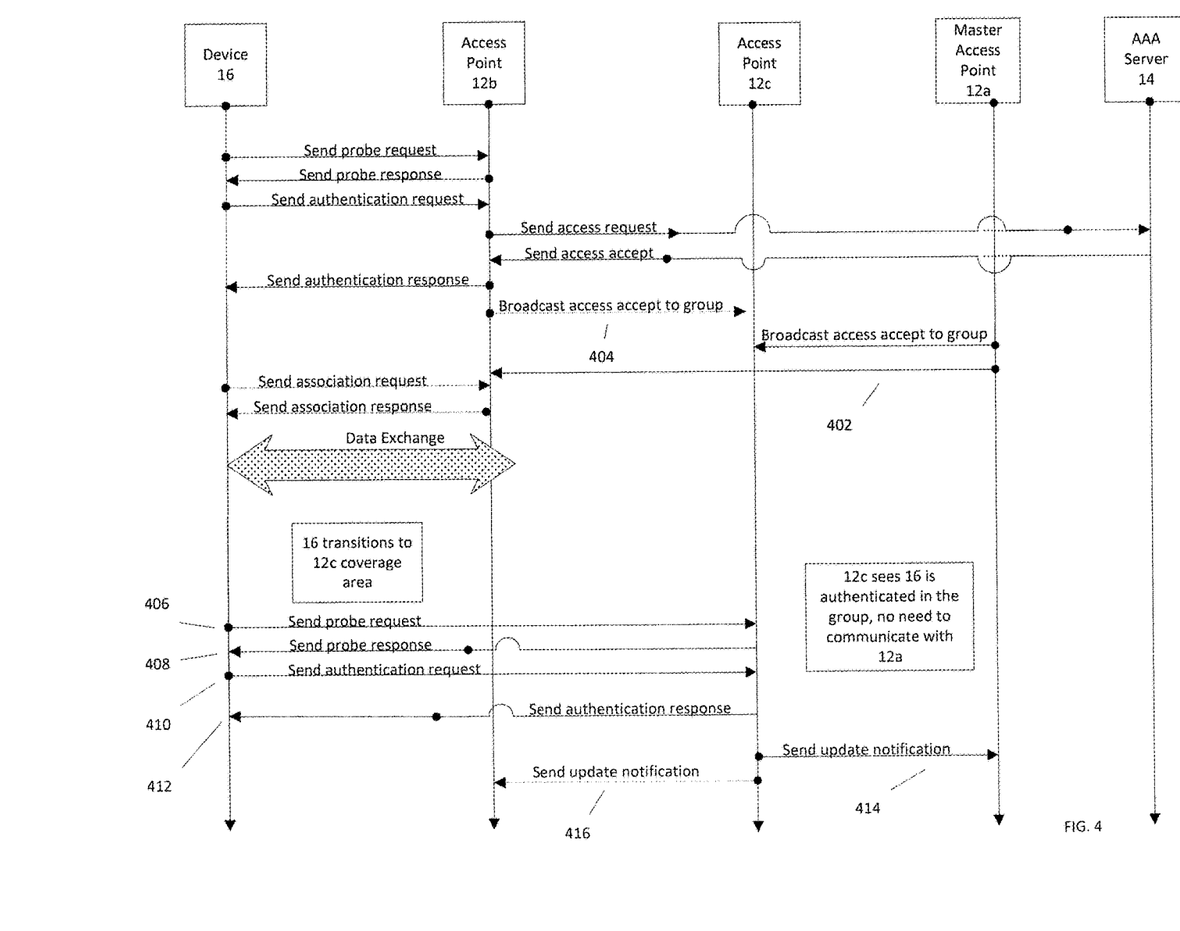
FIG. 4 illustrates an alternative process for authenticating a device while it moves from one access point to the next access point of a group in the wireless network.

FIG. 4 shows an alternative process for reducing authentication signaling in a wireless network using a master access point, according to this disclosure. Many of the operations shown in FIG. 4 are the same as or similar to corresponding operations in FIG. 3. Detailed descriptions of those operations will not be repeated here.

Upon device 16 authentication at access point 12*b*, master access point 12*a* sends an access accept message 402 to all access points 12 in group 20. In the case where there is no master access point, access point 12*b* will send a broadcast access accept message 404 to the group. As device 16 moves in range of access point 12*c*, a probe request message 406 and a probe response message 408 are exchanged between device 16 and access point 12*c*. Access point 12*c* processes the authentication request message 410 from device 16 and determines that device 16 is already authenticated in group 20. Access point 12*c* sends an authentication response message 412 to device 16 and sends an update notification message 414 to master access point 12*a* indicating that device 16 is now associated with access point 12*c*. In the case where there is no master access point, access point 12*c* sends an update notification message 416 to the group. No processing is performed at authentication server 14 and no additional response processing is needed at master access point 12*a*.

Figure 5:
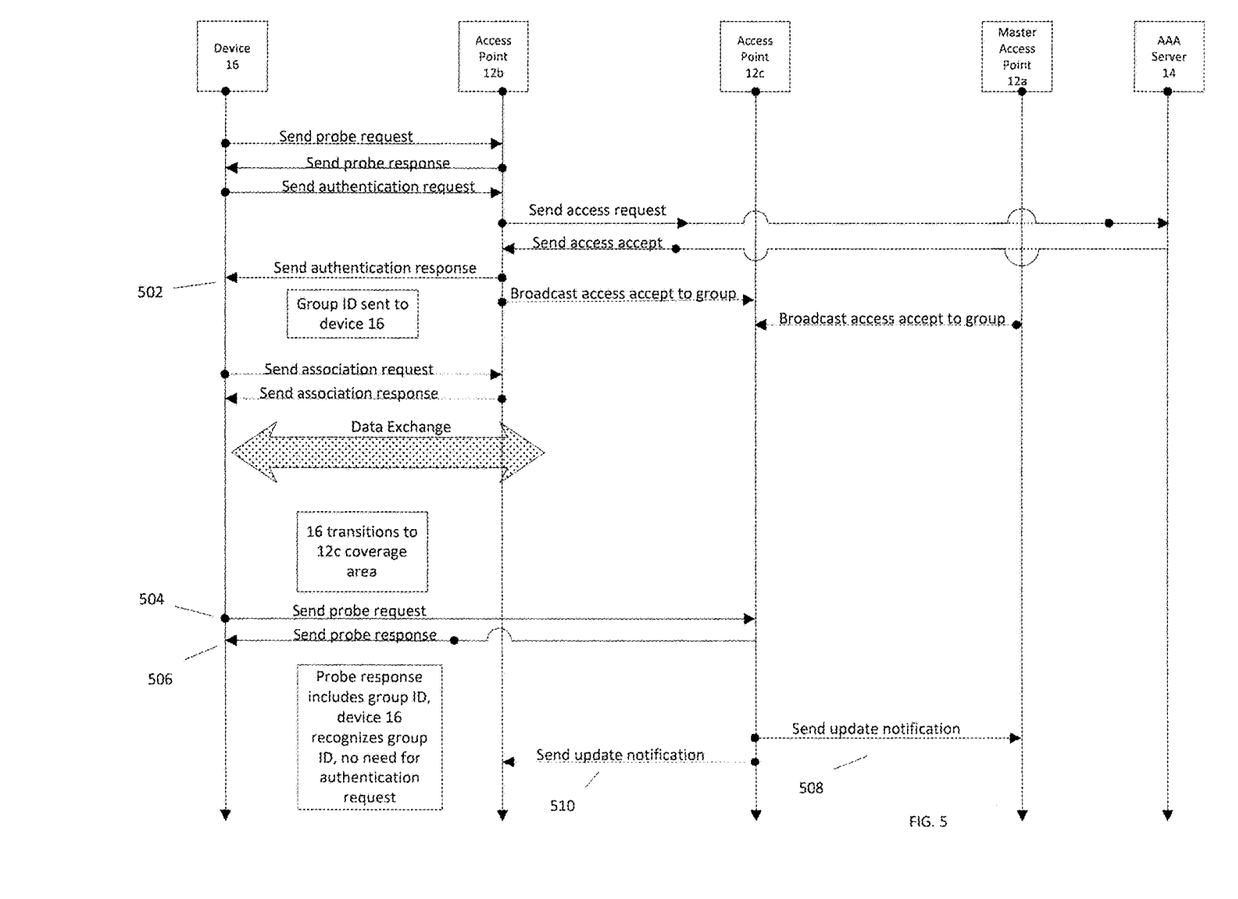
FIG. 5 illustrates another alternative process for authenticating a device while it moves from one access point to the next access point of a group in the wireless network.

FIG. 5 shows another alternative process for reducing authentication signaling in a wireless network using a master access point, according to this disclosure. Many of the operations shown in FIG. 5 are the same as or similar to corresponding operations in FIGS. 3 and 4. Detailed descriptions of those operations will not be repeated here.

Once authenticated, access point 12*b* notifies device 16 of the group identifier. The access points 12 may send the group identifier in periodic beacon (not shown) and/or probe response messages or in an authentication response message 502. Upon coming into range of access point 12*c* within group 20, a probe request message 504 and a probe response message 506 are exchanged between device 16 and access point 12*c*. Access point 12*c* includes the group identifier in probe response message 506 or a separate beacon message. Device 16 compares the group identifier in the probe response message 506 to the group identifier obtained during authentication with access point 12*b*. If there is a match, device 16 will not initiate authentication signaling, thus reducing traffic on the air interface. Authentication signaling will commence if there is not a match or if device 16 desires a data exchange with the access point 12*c*. Access point 12*c* sends an update notification message 508 to master access point 12*a* indicating that device 16 is now associated with access point 12*c*. In the case where there is no master access point, access point 12*c* sends an update notification message 510 to the group.

Although FIGS. 3 through 5 illustrate example processes for reducing authentication signaling in a wireless network using a master access point, various changes may be made to FIGS. 3 through 5. For example, various operations in FIGS. 3 through 5 could overlap, occur in parallel, occur in a different order, or occur any number of times.

Figure 6:
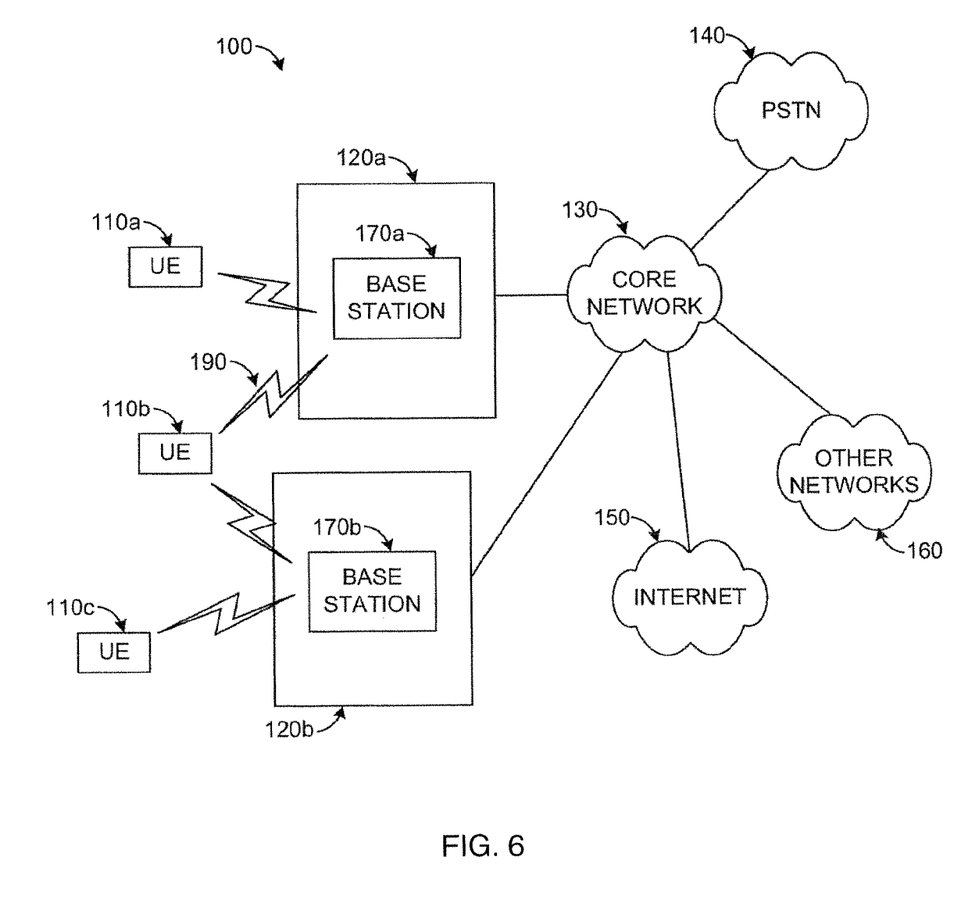
FIG. 6 illustrates an example communication system that that may be used for implementing the devices and methods disclosed herein.

FIG. 6 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA). In some embodiments, one or more of the components of the communication system 100 represents (or is represented by) one or more of the components of the wireless network 10 of FIG. 1.

In this example, the communication system 100 includes user equipment (UE) 110*a*-110*c*, radio access networks (RANs) 120*a*-120*b*, a core network 130, a public switched telephone network (PSTN) 140, the Internet 150, and other networks 160. While certain numbers of these components or elements are shown in FIG. 6, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, a server, a switch, or any other suitable processing entity with a wired or wireless network.

In the embodiment shown in FIG. 6, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement LTE, LTE-A, and/or LTE-B.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 6 illustrates one example of a communication system, various changes may be made to FIG. 6. For example, the communication system 100 could include any number of UEs, base stations, networks, or other components in any suitable configuration.

Figure 7A:
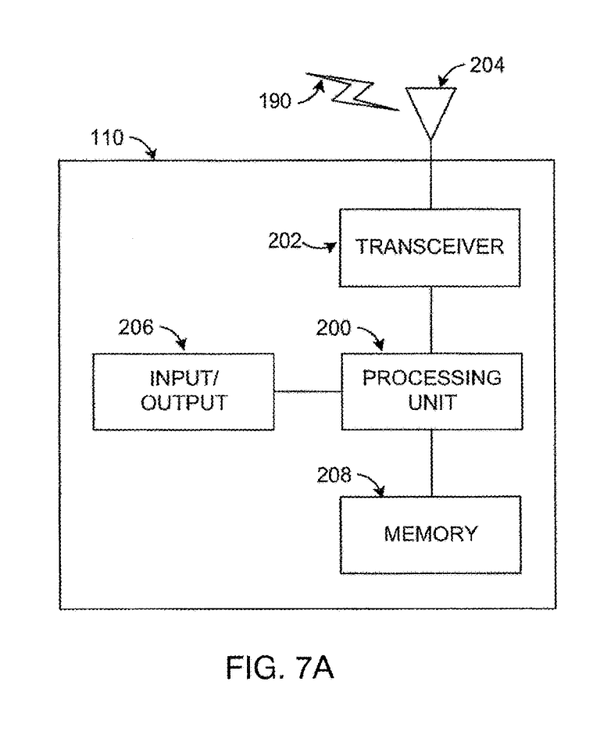
FIGS. 7A and 7B illustrate example devices that may be used for implementing the methods and teachings disclosed herein.
Figure 7B:
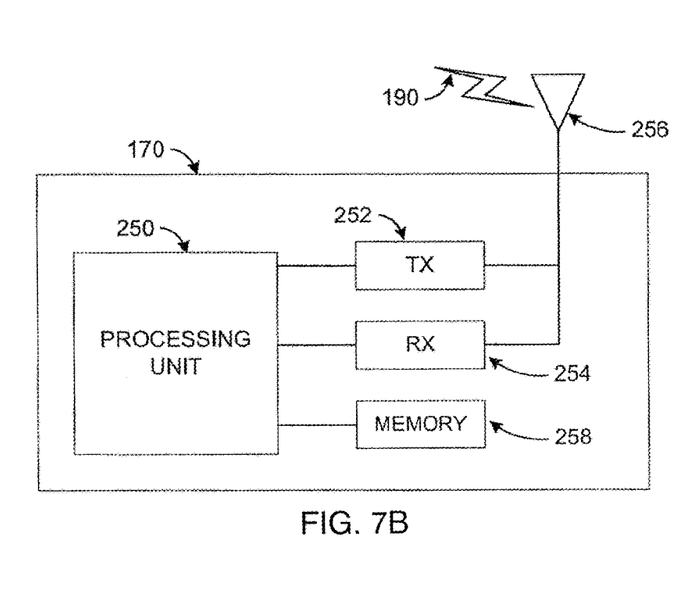

FIGS. 7A and 7B illustrate example devices that may be used for implementing the methods and teachings disclosed herein. In particular, FIG. 7A illustrates an example UE 110 and FIG. 7B illustrates an example base station 170. These components could be used in the system 100 or in any other suitable system.

As shown in FIG. 7A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the D2D standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the coordinated MIMO switching standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method comprising:
   receiving, by a first access point, an access request message from a second access point, the first access point and the second access point belonging to a group of access points in a Wi-Fi local area network that includes an authentication server for authenticating devices attempting to access the Wi-Fi local area network, wherein the access request message requests access to the Wi-Fi local area network by a device in range of the second access point;
   determining, by the first access point, that the device is not associated with the group of access points;
   sending the access request message to an authentication server in response to the device not being associated with the group of access points;
   receiving an access accept message from the authentication server; and
   sending the access accept message to the second access point indicating that the device is authenticated within the group of access points.

2. The method of claim 1, further comprising:
   sending a proxy access accept message to the first access point and the second access point in the group of access points.

3. The method of claim 1, further comprising:
   limiting access for the device to the network;
   determining that the device is requesting data in the network; and
   performing authentication of the device for data access.

4. The method of claim 1, further comprising broadcasting the proxy access accept message to the first access point and the second access point.

5. A non-transitory computer readable medium including code, the code when executed operable to:
   receive, by a first access point, an access request message from a second access point, the first access point and the second access point belonging to a group of access points in a Wi-Fi local area network that includes an authentication server for authenticating devices attempting to access the Wi-Fi local area network, wherein the access request message requests access to the Wi-Fi local area network by a device in range of the second access point;
   determine, by the first access point, that the device is not authenticated within the group of access points;
   send the access request message to an authentication server in response to the device not being associated with the group of access points;
   receive an access accept message from the authentication server; and
   send the access accept message to the second access point indicating that the device is authenticated within the group of access points.

6. The computer readable medium of claim 5, wherein the code is further operable to:
   send a proxy access accept message to the first access point and the second access point.

7. The computer readable medium of claim 5, wherein the code is further operable to:
   limit access for the device to the network;
   determine that the device is requesting data in the network; and
   perform authentication of the device for data access.

8. The method of claim 1, wherein the group of access points is a member of a cluster.

9. A first access point:
   a processor; and
   a non-transitory computer readable storage medium storing programming for execution by the processor, the programming including instructions to:
   receive an access request message from a second access point, the first access point and the second access point belonging to a group of access points in a Wi-Fi local area network that includes an authentication server for authenticating devices attempting to access the Wi-Fi local area network, wherein the access request message requests access to the Wi-Fi local area network by a device in range of the second access point;
   determine that the device is not authenticated within the group of access points;
   send the access request message to an authentication server in response to the device not being associated with the group of access points;

receive an access accept message from the authentication server; and send the access accept message to the second access point indicating that the device is authenticated within the group of access points.

10. The first access point of claim 9, wherein the programming further includes instructions to:

send a proxy access accept message to the first access point and the second access point.

11. The first access point of claim 9, wherein the programming further includes instructions to:

limit access for the device to the network;

determine that the device is requesting data in the network; and perform authentication of the device for data access.

\* \* \* \* \*